United States Patent [19]

Raidel

[11] 4,420,171
[45] Dec. 13, 1983

[54] HEAVY VEHICLE SUSPENSION ASSEMBLY WITH FREE FLOATING SPRINGS AND AXLE STABILIZING TORQUE ROD

[76] Inventor: John E. Raidel, Rte. 9, Box 400-M, Springfield, Mo. 65804

[21] Appl. No.: 406,023

[22] Filed: Aug. 6, 1982

Related U.S. Application Data

[62] Division of Ser. No. 196,696, Oct. 14, 1980, Pat. No. 4,371,189.

[51] Int. Cl.$^3$ ............................................. B60G 11/02
[52] U.S. Cl. ....................................... 280/682; 267/31
[58] Field of Search ............... 280/682, 686, 718, 720, 280/713; 267/43, 36 R, 40, 56, 46, 31

[56] References Cited

U.S. PATENT DOCUMENTS

| | | | |
|---|---|---|---|
| 3,117,799 | 1/1964 | Behnke | 280/682 |
| 3,469,860 | 9/1969 | Hutchens | 280/682 |
| 3,602,523 | 8/1971 | Poulas | 28/682 |

Primary Examiner—Robert R. Song
Attorney, Agent, or Firm—Rogers, Eilers & Howell

[57] ABSTRACT

A first embodiment of a leaf spring suspension assembly for a tractor trailer or the like having single or multiple axles includes a first and second hanger with a camelback spring slidingly secured to an axle bracket assembly with a single torque rod extending between the forward hanger and the axle bracket assembly to stabilize same and prevent axle wind up or wheel hopping. In a multiple axle vehicle, a pivoting type equalizer is mounted between leaf springs and provides the bearing support for an end of each spring. In a second embodiment, an equalizer is supported from the chassis member by an elastomeric spring member with a shock absorber dampening the oscillation thereof. The equalizer is stabilized in the fore and aft direction by a mounting bracket and web assembly within which the mounting bracket extends, and a telescoping tube assembly vertically aligned and surrounding the shock absorber to permit vertical movement but restrict fore and aft movement of same. A third embodiment has a free floating shackle assembly which rotatably mounts an end of each leaf spring to permit pivoting movement of the leaf spring with respect to the shackle assembly. The same torque rod and axle bracket assembly stabilizes the axle and permits relative sliding movement between each leaf spring and its respective axle to enhance the pivoting movement in the shackle assembly.

10 Claims, 16 Drawing Figures

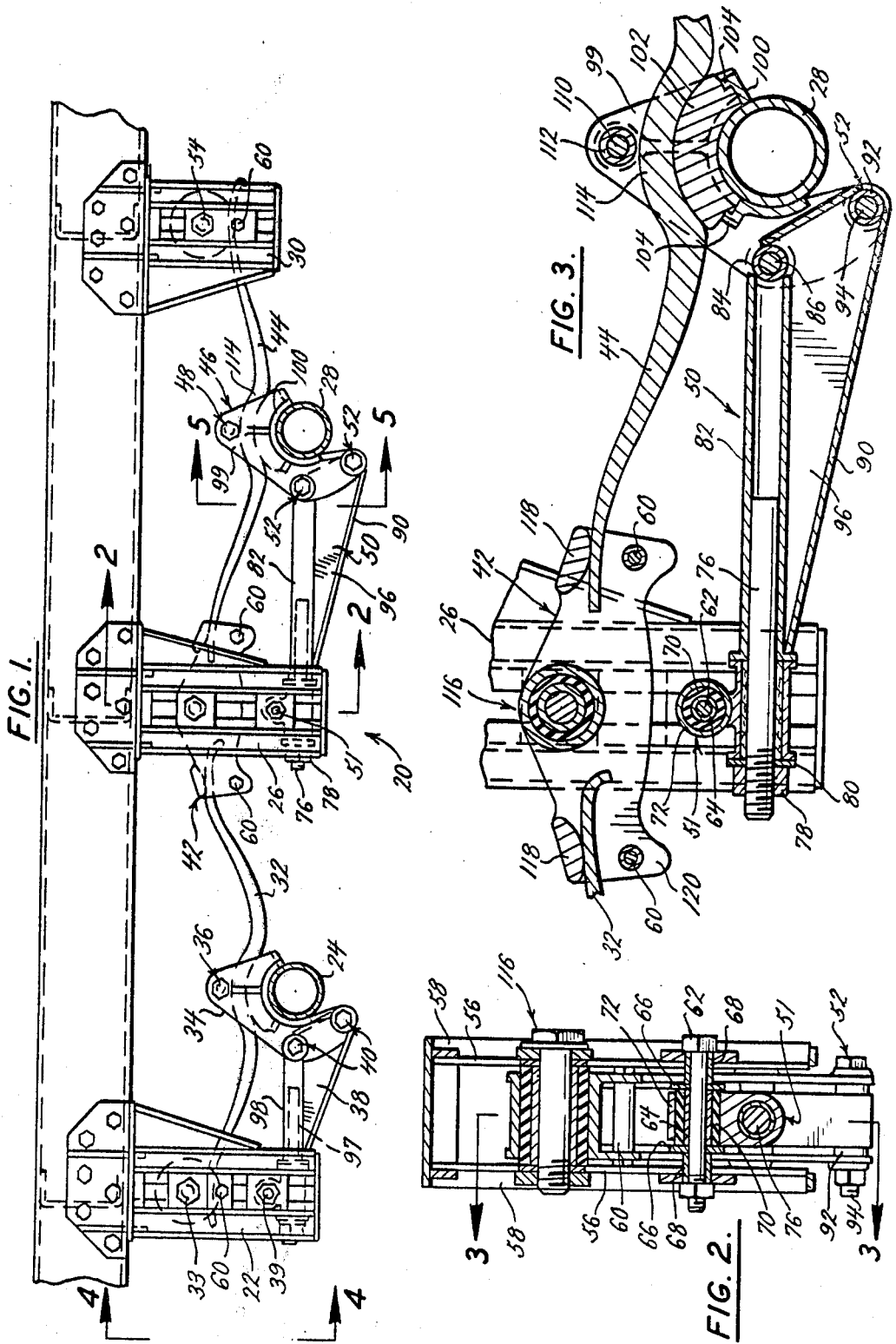

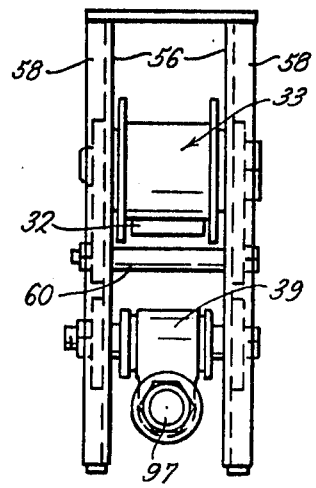
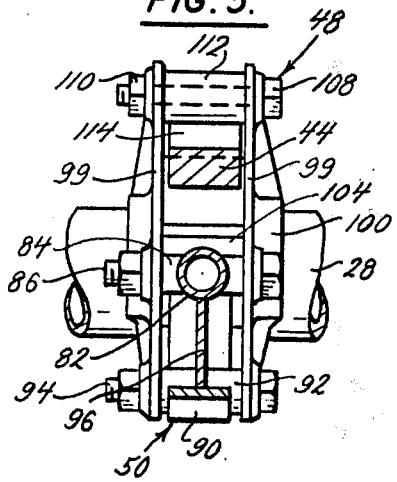
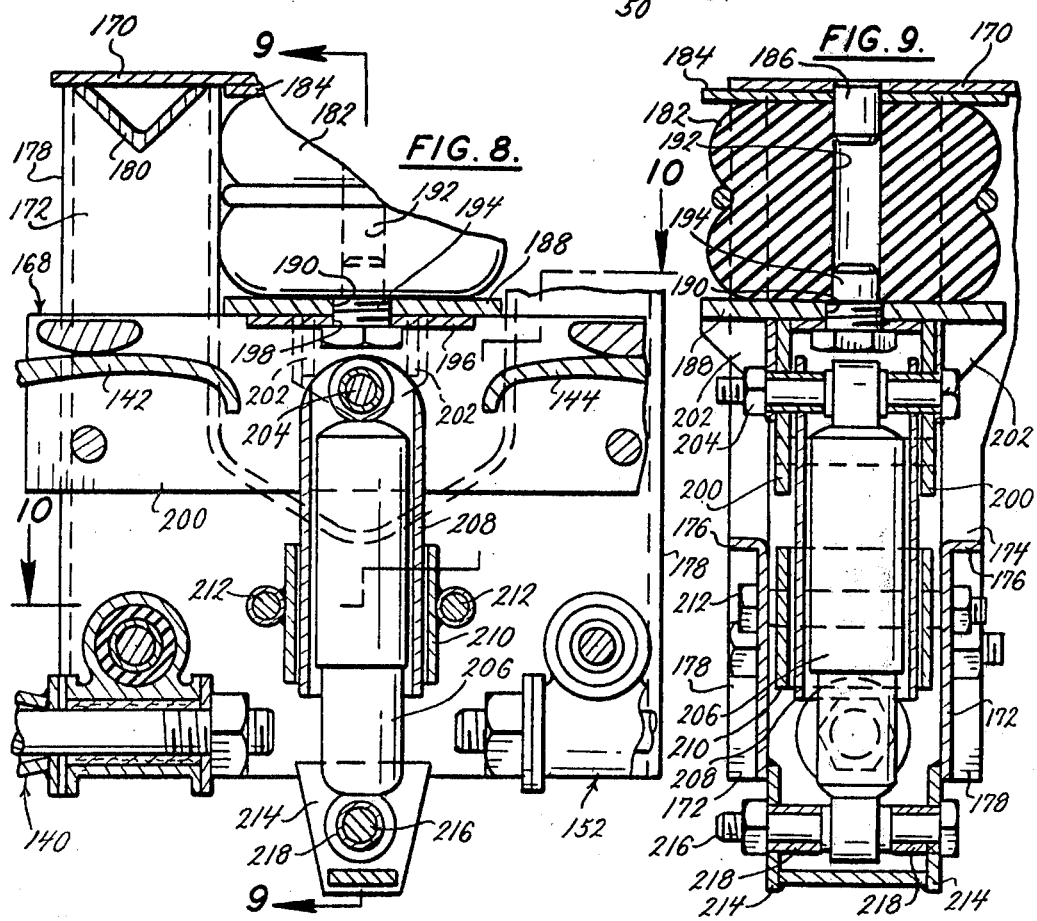

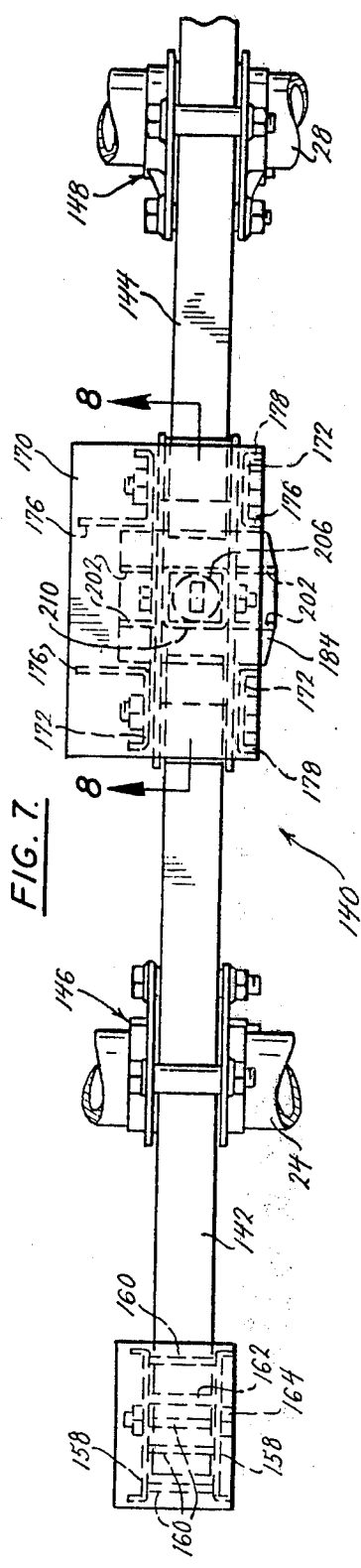

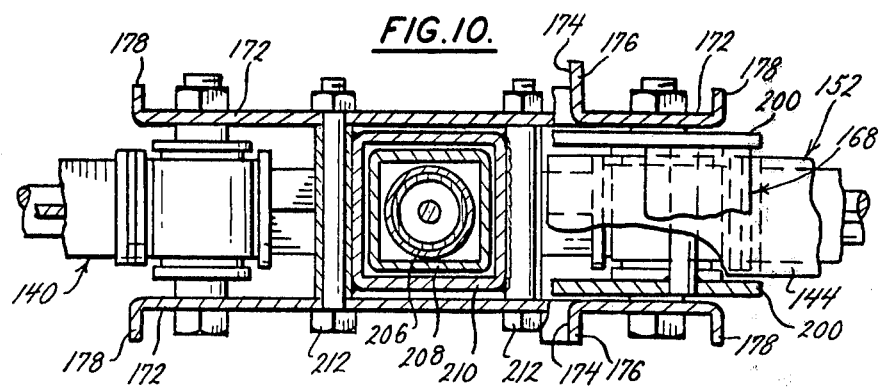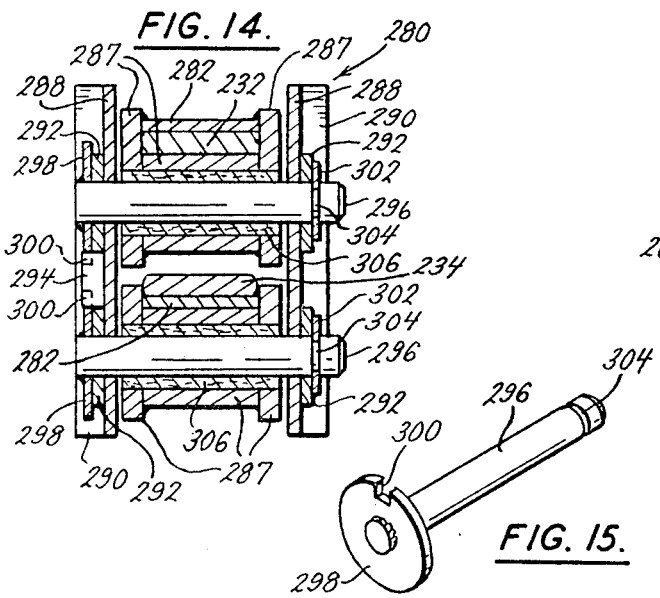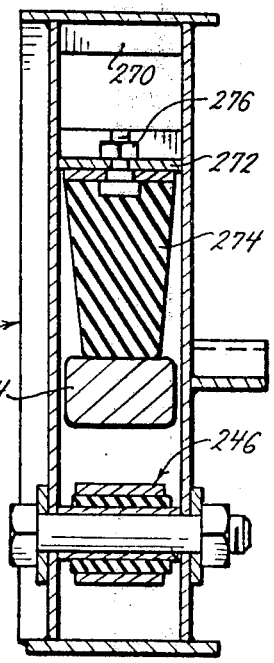

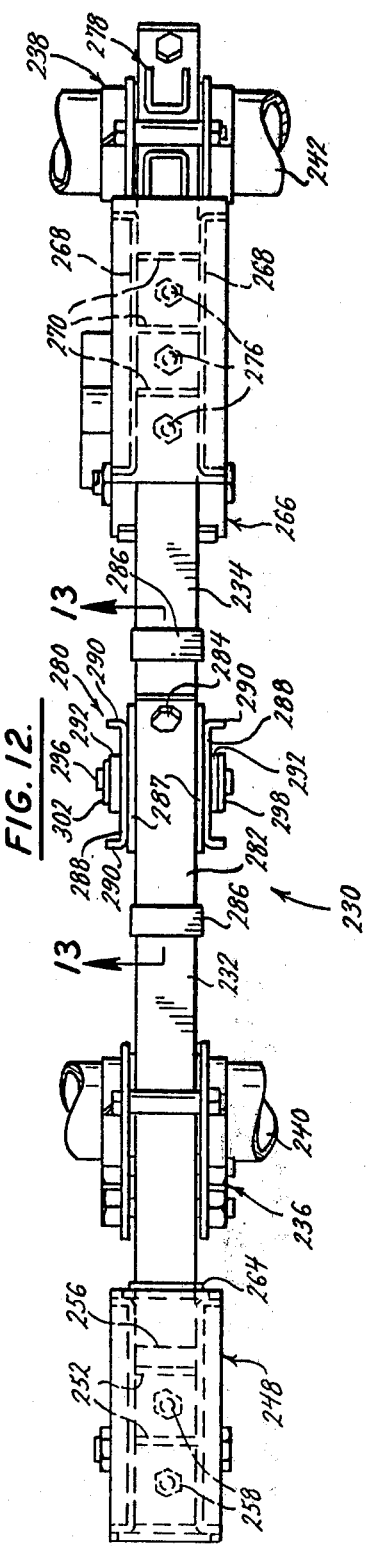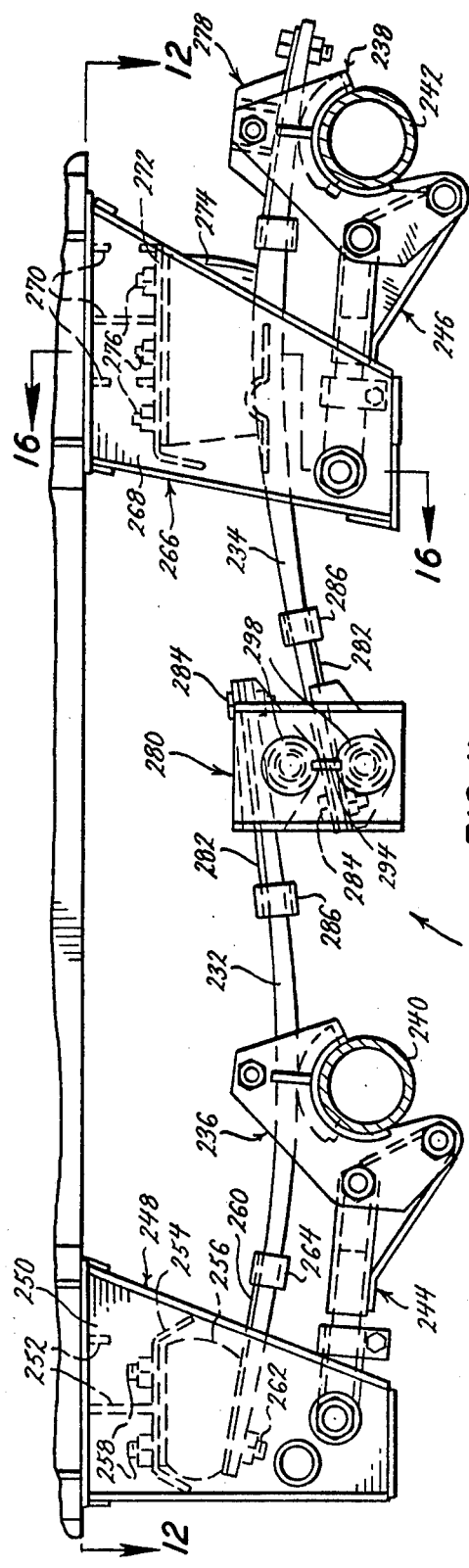

HEAVY VEHICLE SUSPENSION ASSEMBLY WITH FREE FLOATING SPRINGS AND AXLE STABILIZING TORQUE ROD

This application is a division of application Ser. No. 196,696, filed Oct. 14, 1980, now U.S. Pat. No. 4,371,189, issued Feb. 1, 1983.

BACKGROUND AND SUMMARY

Heavy over-the-road vehicles including tractor trailer trucks and the like require a suspension to support its chassis from one or more axles. The demands on these suspension systems are quite great as, among other things, they must have springs with sufficient rigidity to withstand the heavy loads carried by these vehicles, they must stabilize the axle and prevent wind up or wheel hopping as the brakes are applied, and, for multiple axle vehicles, they must distribute the weight by shifting excess loading from one axle to another to thereby balance the load over the axles. A suspension should be relatively easy to install and should provide a way to adjust the axle height and longitudinal placement of the axles with respect to the chassis to ensure proper wheel and axle alignment. Another requirement is that the suspension provide an ease of maintenance including a design which facilitates the replacement of springs or any other component which is subject to wear or possible damage. Preferably, the suspension should permit as much repair or maintenance as is possible without removing or disassembling it from the vehicle.

Invariably, leaf spring suspension assemblies of the prior art utilize axle mounts having U-bolts or some other means to rigidly secure the leaf spring to the axle. This construction helps to stabilize the axle but makes it more difficult to remove and install the leaf spring and also, for multiple axle vehicles, hinders relative lateral movement of the leaf spring with respect to the axle as an aid in balancing the load amongst the axles. An example of a leaf spring suspension assembly which has an axle mount positively securing the spring to the axle is disclosed in applicant's own U.S. Pat. No. 3,499,660, issued Mar. 10, 1970, incorporated herein by reference. Applicant's patented suspension represents a significant improvement over the prior art by providing many advantages previously unavailable. Some of these are leaf spring ends which are free, shifting of the load being accomplished through the rotatably mounted equalizer which can tilt in either direction should an unequal force be applied by the spring ends resting on bearing pads supported at opposite ends of the equalizer. Thus, applicant's prior patented suspension is an excellent one which utilizes leaf springs clamped to the axle and which provides unique advantages over the prior art.

In the first embodiment of applicant's invention described herein, a unique torque rod and axle mount provide a means to stabilize the axle without requiring that it be positively clamped or otherwise secured to the leaf spring itself. Thus, the leaf spring is freed up and is permitted to slide laterally across the axle in response to varying loads as an aid in balancing the load between axles in a multiple axle vehicle. Furthermore, this unique axle mount reduces the amount of time required to install the suspension and also the amount of time required to replace a leaf spring. Many of the same advantages of applicant's prior patented suspension are carried over into applicant's present invention and include the vertically adjustable bearings supporting the leaf spring ends, the vertically adjustable equalizer, adjustable length torque rods, a rotatably mounted equalizer, and other advantages as described in applicant's prior patent, mentioned above. In addition to these, the leaf springs of the present invention are free floating and have a "camel-back" or curvilinear medial section which approximates the curvature of the axle and rests on a wear pad made of nylon or the like. A roller assembly mounts above the curvilinear portion and rolls along the spring as it moves laterally with respect to the axle. The change in curvature of the leaf spring serves as a stop which prevents excess lateral movement or over-shifting of the spring.

The torque rod and axle bracket assembly utilize two pivotal connections at the axle and a resilient pivotal connection between the torque rod and a hanger to provide unrestricted vertical deflection of the axle with respect to the chassis with a limited oscillation of the axle about the chassis. The capability for limited oscillation of the axle is provided by the resilient pivotal connection of the torque rod to the hanger, and has been previously described in applicant's U.S. Pat. No. 3,081,086 issued Apr. 2, 1974, incorporated herein by reference.

In applicant's second embodiment, all the advantages of applicant's first embodiment are carried over and a new design, free floating equalizer enhances the sharing of load and balancing between axles in addition to providing a softer ride by the addition of a spring means in place of the rigid pivotal connection of the equalizer. To maintain the equalizer in vertical alignment as the leaf springs shift laterally across the axles (longitudinally with respect to the chassis), a male fiber tube is bolted to the equalizer and is received by a female tube bolted to a hanger which surrounds the equalizer. Thus, as the equalizer moves in a vertical direction, the male tube slides freely within the female tube and maintains it in vertical alignment. A shock absorber extends through the male tube and connects between the equalizer and the hanger to dampen the oscillations of the equalizer as it is supported by an elastomeric spring member from the chassis itself. A mounting plate between the elastomeric spring member and the equalizer extends between a web fashioned in the third hanger and on opposite sides thereof to also help prevent any tendency of the equalizer to move longitudinally with respect to the chassis in response to lateral shifting of the leaf spring. The hanger which surrounds the equalizer also provides the mounting for torque rods on opposite sides of the hanger, thereby concentrating most of the suspension's components in a single hanger assembly which simplifies installation and adjustment of the suspension.

Applicant's third embodiment utilizes the same axle bracket assembly and torque rod arrangement to stabilize the axle as is found in the first and second embodiments. However, the leaf springs are rearranged to provide for the use of a free floating shackle assembly to secure an end of each leaf spring and thereby enhance the shifting and balancing of load between the axles in combination with applicant's improved axle bracket assembly and torque rod stabilization. Applicant's prior U.S. Pat. No. 4,131,297 issued Dec. 26, 1978, the disclosure of which is incorporated herein by reference, shows a similar leaf spring arrangement along with a free floating shackle assembly. That patented suspension system is an excellent one which provides parallelogram stabilized axles and a shackle assembly using elastomers for securing the ends of the leaf spring thereto. In the present invention, applicant uses his new design single torque arm and axle bracket assembly to stabilize the axle, thereby eliminating the requirement for parallelogram stabilizing including a radius rod at the center of the vehicle. Furthermore, applicant's present invention provides a unique rotatable mount in the shackle assembly which permits great flexibility in the leaf springs and which also eliminates the requirement for the elastomeric spacers of applicant's prior design. Each bushing assembly includes a fiber sleeve member which interfaces between the leaf spring mount and a pivot pin, thereby eliminating any metal to metal rubbing and significantly reducing both friction and wear in the shackle. While elastomer spacers provide excellent service, there is no doubt that the continual flexing they experience would require them to be replaced, although infrequently, but at shorter intervals than the shackle assembly of applicant's third embodiment. Thus, applicant's present invention represents a significant improvement over his prior suspension, which itself is a significant improvement over the prior art.

Some of the features and benefits of applicant's suspensions have been mentioned above, and a fuller understanding may be gained by reading and examining the drawings and the detailed description of the preferred embodiment which follows.

DESCRIPTION OF THE DRAWINGS

FIG. 1 depicts the suspension assembly of applicant's first embodiment as might be viewed from the side of a vehicle having multiple axles;

FIG. 2 is a cross-sectional view taken along the plane of line 2—2 in FIG. 1 and detailing the pivoting members of the central equalizer;

FIG. 3 is a cross-sectional view taken along the plane of line 3—3 in FIG. 2 and detailing the torque rod and other components of the rear half of the first embodiment;

FIG. 4 is taken along the plane of line 4—4 in FIG. 1 and is a front view of applicant's first embodiment;

FIG. 5 is a cross-sectional view taken along the plane of line 5—5 in FIG. 1 and detailing the axle bracket assembly of the first embodiment;

FIG. 6 is a side view of applicant's second embodiment;

FIG. 7 is taken along the plane of line 7—7 in FIG. 6 and is a top view of applicant's second embodiment.

FIG. 8 is a cross-sectional view taken along the plane of line 8—8 in FIG. 7 and detailing the construction of the spring mounted equalizer;

FIG. 9 is a cross-sectional view taken along the plane of line 9—9 in FIG. 8 and detailing the internal structure of the load equalizer;

FIG. 10 is a cross-sectional view taken along the plane of line 10—10 in FIG. 9 and further detailing the structure of the spring mounted equalizer of the second embodiment;

FIG. 11 is a side view of applicant's third embodiment;

FIG. 12 is taken along the plane of line 12—12 in FIG. 11 and is a top view of applicant's third embodiment;

FIG. 13 is a cross-sectional view taken along the plane of line 13—13 in FIG. 12 and detailing the shackle assembly;

FIG. 14 is a cross-sectional view taken along the plane of line 14—14 in FIG. 13 and detailing the pivot pin construction of the shackle assembly;

FIG. 15 is a perspective view of a pivot pin of the shackle assembly; and

FIG. 16 is a cross-sectional view taken along the plane of line 16—16 in FIG. 11 and detailing the rear hanger assembly of the third embodiment.

DETAILED DESCRIPTION OF THE PREFERRED EMBODIMENT

Applicant's first embodiment 20 is shown as used in a multiple axle application and for one side of the vehicle. However, it is to be understood that applicant's first embodiment 20 may also be used on a single axle vehicle by using fixed hanger assemblies at both ends of the suspension. As shown in FIGS. 1-5, applicant's first embodiment 20 includes generally a first hanger 22 mounted forwardly of first axle 24, a second hanger 26 disposed between the first axle 24 and a second axle 28, and a third hanger 30 mounted to the rear of the second axle 28. A first leaf spring 32 has its forward end bearing upwardly against bushing 33 and is slidably secured to the first axle 24 by a first axle bracket assembly 34 having a roller assembly 36 extending over the top of the leaf spring 32. A first torque rod 38 is resiliently pivotally mounted to the first hanger 22 by swivel connection 39 and rigidly mounted to the first axle bracket assembly 34 at each of two spaced apart positions by bushings 40. A pivotable equalizer 42 is rotatably mounted to the second hanger 26, against which the rearward end of first leaf spring 32 bears upwardly.

Similarly, the first embodiment 20 includes a second leaf spring 44 slidably mounted to the second axle 28 by a second axle bracket assembly 46 having a roller assembly 48. A second torque rod 50 is resiliently pivotally mounted to the second hanger 26 by swivel connection 51 and rigidly mounted to the second axle bracket assembly 46 by two spaced apart bushings 52, the second leaf spring 44 bears downwardly on the second axle 28 and upwardly on the pivotable equalizer 42 and the resilient bushing 54 mounted in the third hanger 30.

As is apparent from this short description, each of the two leaf springs 32, 44 are free to move laterally across each of their respective axles 24, 28 (longitudinally with respect to the chassis) in response to unequal loading of the axles which causes the pivotable equalizer 42 to tilt and balance the load. Both ends of each leaf spring are free floating to permit this lateral shifting and greatly increase the effectiveness of the suspension in balancing the load between the axles 24, 28. Torquing of the axles 24, 28 about their central axes is resisted and the axle is stabilized by the torque rods 38, 50 which are rigidly mounted by bushings 40, 52 at two spaced apart positions on the axle bracket assemblies 34, 46. The forward end of each torque rod 38, 50 is resiliently pivotally mounted by swivel connections 39, 51 to provide for a limited oscillation of one end of an axle with respect to its other end and with respect to the chassis and also accommodate vertical deflection of the axles 24, 28 with respect to the chassis in response to loading on the vehicle. The second torque rod 50 is shown as being adjustable in length and permits alignment of one end of the axle 28 with respect to the other. The suspension on the opposite side of the vehicle would have the adjustable torque rod at the first axle position so that each axle would be horizontally adjustable to provide proper alignment.

Applicant's first embodiment 20 will now be more specifically described. Each of the hangers 22, 26, 30 include side frames 56 with gusset plates 58 reinforcing same, as is well known in the art. Spring stops 60 are located throughout the suspension and support the springs 32, 44 when the vehicle is lifted from its wheels. Bushings 33, 54; spring stops 60; and swivel members 39, 51 are all vertically adjustable between side frames 56 as is shown in greater detail in applicant's prior U.S. Pat. No. 3,499,660 to permit adjustment of the vertical axle height with respect to the vehicle.

As shown in FIGS. 2 and 3, the forward end of second torque rod 50 is resiliently pivotally secured to the second hanger 26 by swivel connection 51 which includes an adjustable bolt and mounting plate assembly 62 extending between side frames 56. An inner bearing sleeve 64 surrounds bolt 62 and is centered between side frames 56 by washers 66 and spacer sleeves 68. A resilient bushing member 70 surrounds inner sleeve 64, and is in turn surrounded by swivel member 72 and supports the mounting stud 76 of second torque rod 50. A mounting nut 78 and washer 80 screws onto the threaded end of mounting stud 76 and thereby secures second torque rod 50 to swivel member 72.

As shown in FIGS. 3 and 5, second torque rod 50 has a rod member 82 with an integral sleeve 84 which surrounds bolt 86 in axle bracket assembly 46. The threaded mounting stud 76 has threads on one end and is plug welded to rod member 82. Additional spacer washers, such as washer 80, may be added on either side of swivel member 72 to provide some adjustment for alignment purposes. A rib member 90 extends along the bottom of the torque rod 50 and also has an integral sleeve member 92 surrounding bolt and nut assembly 94. The rib member 90 extends between the sleeves 84, 92 and a strengthening web 96 connects rod member 82 with rib member 90 to complete the torque rod 50. Thus, torque rod 50 is rigidly secured to the second bracket assembly 46 at each of two spaced apart positions identified as bushings 52 comprising bolt and nut assemblies 86, 94. The effective length of torque rod 50 may be adjusted by removing mounting nut 78, adding or removing washers 80 at either side of swivel member 72, and then replacing nut 78. This adjustment is used to "square up" the axle 28 with respect to the vehicle chassis. The first torque rod 38 extends between first hanger 22 and first axle bracket assembly 34 and is very similar to the second torque rod 50. In first torque rod 38, the mounting stud 97 is welded or otherwise secured to rod member 98, and the first axle 24 may be aligned similarly to second axle 28.

The second axle bracket assembly 46 is shown in more detail in FIG. 5, and includes a pair of brackets 99 connected by a semi-circular seat member 100 resting atop second axle 28. As explained above, bolt and nut assemblies 86, 94 extend between brackets 99 to secure the second torque rod 50. A wear pad 102 is held in position atop the seat member 100 by bracket tabs 104 on either side thereof. A roller assembly 48 includes a bolt 108 and nut 110 with a sleeve 112 extending between brackets 99 and rotatably mounted around the shank of bolt 108. Sleeve 112 is free to rotate about bolt 108 and is held in firm contact against second leaf spring 44 thereby. The second leaf spring 44 has a medial curvilinear portion 114 (shown in FIG. 1) formed to approximate the curvature of wear pad 102 and to enhance sliding movement therebetween. As can be seen from FIG. 1, the curvature of second leaf spring 44 gradually changes beyond this medial portion 114 and serves to limit the permitted lateral movement of leaf spring 44 as it reaches the contact point of roller assembly 48. The first axle bracket assembly 34 is of the same construction as the second axle bracket assembly 46 and it is believed that further detailed description is unnecessary.

The pivotable equalizer 42 is mounted between the side frames 56 of second hanger 26 by a resilient bushing 116, shown more fully in FIG. 3. The equalizer 42 includes a pair of wear pads 118 which slidingly engage the ends of leaf springs 32, 44. A pair of spring stops 60 are mounted and extend between the side plates 120 of equalizer 42. The construction and adjustment of the position of equalizer 42 is similar to that shown in applicant's U.S. Pat. No. 3,499,660 and it is believed that no further description thereof is necessary. The equalizer 42 is pivotally mounted and freed therefore to rotate about the resilient bushing 116 in response to varying upward pressures between first and second leaf springs 32, 44.

The other components in applicant's first embodiment 20 have been identified generally and are of the same construction as explained in more detail in applicant's prior patents, incorporated herein by reference, or as disclosed and described as part of the other half of the suspension.

Applicant's second embodiment 140 is shown in FIGS. 6-10 and includes many of the same components as in applicant's first embodiment including first and second leaf springs 142, 144, first and second axle bracket assemblies 146, 148, and first and second torque rods 150, 152. A forward hanger assembly 154 and rear hanger assembly (not shown) are the same and only one will be described and shown for purposes of illustration. Forward hanger assembly 154 includes a pair of side frames 158 with support brackets 160 extending therebetween to support a wear pad 162, against which the forward end of leaf spring 142 bears upwardly. A spring stop 164 also extends between side frames 158 and below leaf spring 142 to support the leaf spring 142 when the vehicle is raised off its wheels.

The principal difference between the first and second embodiments is the middle hanger assembly 166 and the elastomer mounted equalizer 168 which enhances the balancing of uneven loading between the axles, and further cushions the chassis from the leaf springs to improve the riding characteristics of the suspension.

The middle hanger assembly 166 is shown in more detail in FIGS. 8 and 9 and includes a mounting plate 170 and two side frames 172 depending downwardly therefrom, each side frame 172 having an opening 174 outlined by a web 176 surrounding same. The front and rear ends of the side frames 172 are curved outwardly into webs 178 to provide extra strength to the structure. Gussets 180 extend between the mounting plate 170 and side frames 172 as shown in FIGS. 6 and 7 and add still further support. An elastomeric spring member 182 has an upper mounting plate 184 and mounting stud 186 to secure it to the chassis. A lower mounting plate 188 has a threaded opening 190 aligned with the central opening 192 in the spring member 182 for receiving the mounting bolt 194. The equalizer 168 has an upper mounting plate 196 with a mounting hole 198 aligned with threaded opening 190 and central opening 192 for securing the equalizer 168 to the lower end of spring member 182. A pair of downwardly depending mounting tabs 200 are welded or otherwise secured to lower mounting plate 188 and gussets 202 are welded therebetween to strengthen and support tabs 200. A nut and bolt assembly 204 mount the upper end of shock absorber 206 to mounting tabs 200, along with the upper end of a male guide tube 208 which surrounds shock absorber 206 and extends downwardly between shock 206 and mounting tabs 200. A female guide tube 210 is bolted in place between side frames 172 by bolts 212 and slidingly receives the male guide tube 208. Another pair of shock mounting tabs 214 are welded to and extend downwardly from side frames 172 and a nut and bolt assembly 216 along with spacers 218 mount the bottom of shock absorber 206 thereto.

Applicant's second embodiment 140 provides a unique arrangement for mounting and stabilizing the equalizer 168 which not only improves the shock absorbing capability of the suspension but also provides for increased shifting and balancing of load between the first and second axles 24, 28. As is evident from the foregoing description, the equalizer 168 is fixedly secured to the lower mounting plate 188 of the spring member 182, said spring member being in turn fixedly mounted to the chassis. Also, a shock absorber 206 extends between the equalizer 168 and the bottom of middle hanger assembly 166. Thus, the equalizer 168 is mounted to the chassis between elastomeric spring member 182 and shock absorber 206. This provides for an increased up and down deflection over the equalizer shown in applicant's first embodiment and thus enhances the load shifting capabilities of the suspension and also helps absorb shock which would otherwise be transmitted through the rigid mounting of the equalizer to the chassis.

The equalizer 168 is stabilized to prevent its movement in the fore and aft direction by two separate assemblies. The lower mounting plate 188 bolted to the equalizer 168 and spring member 182 is sufficiently wide that it extends both inboard and outboard between web members 176. This is best shown in FIG. 7. Thus, fore and aft movement of the equalizer 168 is somewhat restricted by lower mounting plate 188 contacting web members 176. A second structure which stabilizes the equalizer 168 is the male tube member 208 which is slidably received by female tube member 210, both of which surround shock absorber 206. As female tube member 210 is rigidly connected between side frames 172 by bolts 212, male tube member 208 permits vertical movement which might tend to cock male tube member 208. Both of these tube members 208, 210 may be made of a self lubricating fabric bearing material or the like to enhance their sliding movement and reduce wear therebetween. This would also avoid metal to metal contact which would have a tendency to wear rather quickly.

Thus, applicant's second embodiment 140 provides a spring mounted equalizer 168 which has greater freedom of movement in the vertical as well as fore and aft direction while also being restricted to prevent misalignment or damage to the suspension due to overtravel of the springs 142, 144 or equalizer 168. An improved ride is experienced with this embodiment over those suspensions having equalizers which are rigidly mounted to the chassis.

Applicant's third embodiment 230 is shown in FIGS. 11–16 and includes many of the same components as in applicant's first two embodiments including first and second leaf springs 232, 234, first and second axle bracket assemblies 236, 238 mounted to first and second axles 240, 242, and first and second torque rods 244, 246, which are similar to the torque rods disclosed in applicant's prior U.S. Pat. No. 3,499,660. The first hanger 248 includes a pair of side frames 250 with gussets 252 strengthening same. A mounting bracket 254 is welded between side frames 250 and provides the connection point for the elastomeric spring 256 with nut and bolt assemblies 258. A lower mounting plate 260 secures elastomeric spring 256 to first leaf spring 232 with nut and bolt assembly 262 and clamp 264. Thus, the forward end of first leaf spring 232 is supported by elastomeric spring 256 from first hanger assembly 248.

Similarly, a second hanger assembly 266 has a pair of side frames 268 with gussets 270 extending therebetween. A mounting plate 272 is welded between side frames 268 and elastomeric spring 274 is mounted thereto by nut and bolt assemblies 276. Second leaf spring 234 bears upwardly against elastomeric load pad or spring 274 and is not fixedly secured thereto as with first leaf spring 232 and first hanger 248. Instead, the rear of second leaf spring 234 bears downwardly against second axle 242 and has a spring limiter 278 which permits transverse sliding movement of the leaf spring 234 with respect to the axle 242. The spring limiter 278 is similarly constructed to that shown in applicant's prior U.S. Pat. No. 4,131,297, incorporated herein by reference, and it is believed that further detailed explanation of its construction is not necessary.

A free floating shackle assembly 280 is shown more particularly in FIGS. 13 and 14 and provides the connection point for the rear end of first leaf spring 232 and the forward end of second leaf spring 234. Each leaf spring end has a leaf spring end bracket 282 secured thereto by nut and bolt assembly 284 and clamp 286. Leaf spring end brackets 282 are welded to pivoting brackets 287 which rotate in response to spring 232, 234 shifting. The shackle assembly 280 includes a pair of spaced apart side brackets 288 with their vertical edges 290 turned inwardly and outwardly. Shoulder washers 292 are welded to side brackets 288 and provide an upraised bearing surface. A key 294 is welded to the outboard side bracket 288 and extends between shoulder washers 292. Two pivot pins 296 having washers 298 welded thereto extend between side brackets 288, with keyways 300 in washers 298 aligned with engaging key 294. Pivot pins 296 are best shown in FIG. 15. Snap rings 302 fit within grooves 304 of pivot pins 296 and retain pivot pins 296 in position between side brackets 288. A fiber sleeve 306 surrounds each pivot pin 296 and provides the bearing surface for pivot brackets 287. Thus, pivot brackets 287 (and springs 232, 234) are rotatably mounted to pivot pins 296 with fiber sleeve 306 providing a self lubricating bearing surface therebetween.

OPERATION

In operation, applicant's third embodiment 230 provides a leaf spring suspension for a multiple axle vehicle which has enhanced capability for transverse shifting of the leaf springs and thereby balance the load between the axles. Furthermore, this improved capability for shifting of the load is enhanced by the axle bracket assemblies of applicant's present invention which permit axle stabilization with a single torque rod and which permit relative sliding movement between the leaf spring and the axle. Applicant's prior patented suspension as disclosed in U.S. Pat. No. 4,131,297 utilized a free floating shackle assembly with elastomers securing the leaf spring ends to the shackle. In the present invention, the leaf spring ends are rotatably secured to a free floating shackle assembly, thereby eliminating sway bars (panhard bars) and preventing lateral movement of the axles. Thus, a simplified version over the parallelogram type truck-tractor suspension of this type may be used for trailer applications, which do not require a constant pitch of the axle as it moves up and down during operation.

Various changes and modifications would be apparent to one of ordinary skill in the art upon a reading of applicant's disclosure herein. Several preferred embodiments have been disclosed herein as illustrative of applicant's invention, but applicant intends that his invention be limited only by the scope of the claims appended hereto.

What is claimed is:

1. A vehicle suspension assembly for supporting a vehicle chassis on at least two vehicle axles comprising a first and second hanger depending downwardly from the chassis, an equalizer, a third hanger depending downwardly from the chassis at approximately the same position as the equalizer, a spring means mounting said equalizer to the third hanger approximately midway between said first and second hangers, said hangers and equalizer being generally aligned longitudinally of the chassis, said spring means permitting limited vertical deflection of the equalizer with respect to the chassis, a shock means extending between the equalizer and the third hanger to dampen the oscillation of the equalizer, a first leaf spring bearing downwardly on the first axle with an end bearing upwardly on the first hanger and an end bearing upwardly on the equalizer, a second leaf spring bearing downwardly on the second axle with an end bearing upwardly on the equalizer and an end bearing upwardly on the second hanger, means to maintain said leaf springs in a load bearing relationship to said axles and permit relative transverse movement therebetween, and means to maintain said equalizer aligned as it deflects vertically with respect to the chassis.

2. The suspension of claim 1 wherein the equalizer alignment means includes a male guide element pivotally secured to the equalizer and a female guide element fixedly secured to the third hanger and positioned to receive said male element.

3. The suspension of claim 2 wherein the shock extends along the interior of the male guide element.

4. The suspension of claim 3 wherein the male guide element is made of a self lubricating fiber.

5. The suspension of claim 1 wherein each leaf spring is slidingly mounted to its associated axle with an axle mount, each of said axle mounts having a wear pad to engage the spring and a roller assembly extending across the spring to surround it and maintain it in contact with said wear pad, and further comprising a torque rod extending between each axle and the third hanger, each of said torque rods having means to stabilize its associated axle and resist torquing thereof about its central axis.

6. The suspension of claim 5 wherein each torque rod is pivotally secured to its associated axle mount at each of two spaced apart positions, the other end of each torque rod being resiliently pivotally secured to the third hanger to permit vertical deflection and limited oscillation of each axle with respect to the chassis.

7. The suspension of claim 1 wherein the equalizer spring means includes an elastomeric spring with a mounting plate mounting said spring to the equalizer, the third hanger having a guide web substantially abutting the front and rear of said mounting plate to thereby restrict longitudinal shifting of the equalizer.

8. A vehicle suspension assembly for supporting a vehicle chassis on at least two vehicle axles comprising a first and second hanger depending downwardly from the chassis, an equalizer, a spring means mounting said equalizer to the chassis approximately midway between said first and second hangers, said hangers and equalizer being generally aligned longitudinally of the chassis, said spring means permitting limited vertical deflection of the equalizer with respect to the chassis, a shock means to dampen the oscillation of the equalizer, a first leaf spring bearing downwardly on the first axle with an end bearing upwardly on the first hanger and an end bearing upwardly on the equalizer, a second leaf spring bearing downwardly on the second axle with an end bearing upwardly on the equalizer and an end bearing upwardly on the second hanger, means to maintain said leaf spring in a load bearing relationship to said axles and permit relative transverse movement therebetween, and means to maintain said equalizer aligned as it deflects vertically with respect to the chassis.

9. A vehicle suspension assembly for supporting a vehicle chassis on at least two vehicle axles comprising a first and second hanger depending downwardly from the chassis, an equalizer, a spring means mounting said equalizer to the chassis approximately midway between said first and second hangers, said hangers and equalizer being generally aligned longitudinally of the chassis, said spring means permitting limited vertical deflection of the equalizer with respect to the chassis, said equalizer including a generally U-shaped bracket member, a mounting plate, said mounting plate being secured to said U-shaped bracket and having a generally centrally located threaded hole, and a bolt for mounting in said hole and extending upwardly therethrough, said spring means having an axial cylindrical opening for receiving said mounting bolt and securing said spring thereto, a first leaf spring bearing downwardly on the first axle with an end bearing upwardly on the first hanger and an end bearing upwardly on the equalizer, a second leaf spring bearing downwardly on the second axle with an end bearing upwardly on the equalizer and an end bearing upwardly on the second hanger, means to maintain said leaf springs in a load bearing relationship to said axles and permit relative transverse movement therebetween, and means to maintain said equalizer aligned as it deflects vertically with respect to the chassis.

10. The suspension of claim 9 wherein said spring means has an axial opening at its top end, and further comprising a mounting stud extending downwardly from the chassis and into said top axial opening, said spring means being thereby held in place.

* * * * *